Figure 1:
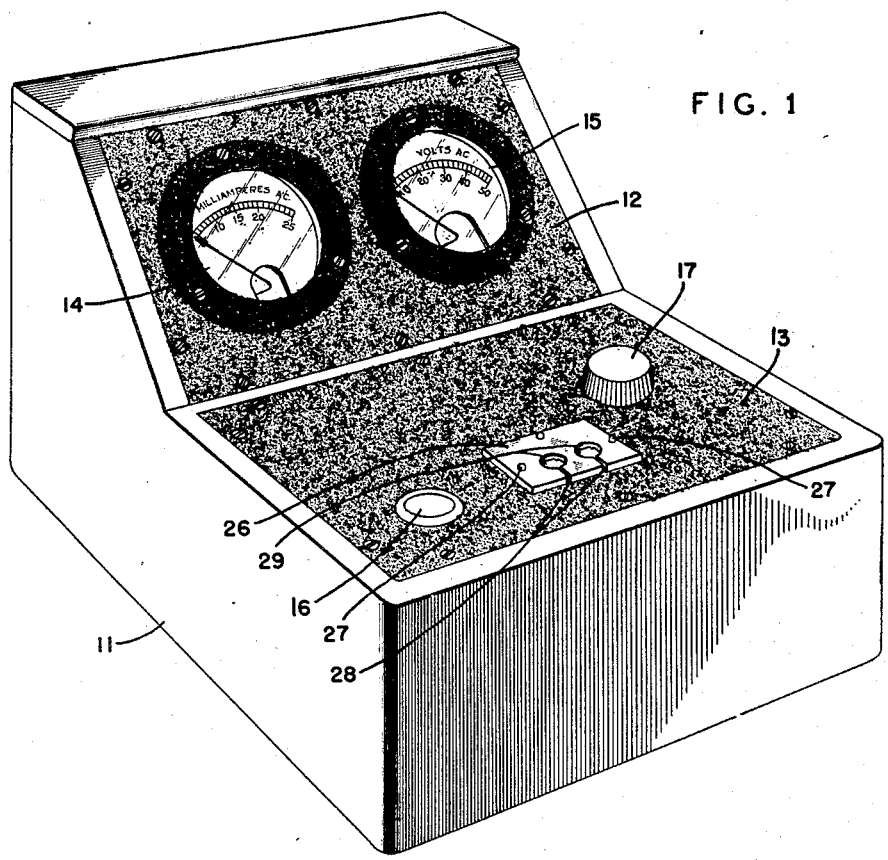

Dec. 3, 1940.  G. H. CAMPION ET AL  2,223,815

MAGNETIC GAUGE

Filed Sept. 29, 1938

INVENTOR.
GEORGE H. CAMPION
HAROLD T. DAHLGREN

BY  *H.B. Whitfield*

ATTORNEY.

Patented Dec. 3, 1940

2,223,815

UNITED STATES PATENT OFFICE 2,223,815

MAGNETIC GAUGE

George H. Campion and Harold T. Dahlgren, Chicago, Ill., assignors to Teletype Corporation, Chicago, Ill., a corporation of Delaware Application September 29, 1938, Serial No. 232,342

5 Claims. (Cl. 177—351)

The present invention relates to galvanometric systems and particularly to testing apparatus employing galvanometric circuits for determining the thickness of surface deposits.

The invention finds special application as an industrial testing apparatus for determining the thickness of nonmagnetic plating deposits on iron or steel. In its specific contemplation, the apparatus is designed to measure the thickness of chromium plating on iron piece parts which are used in the manufacture of magnet cores and/or armatures. The importance of obtaining an accurate determination of the plating thicknesses results from the critical influences which the chromium deposits possess in providing against interference by residual magnetism. Such plating deposits must be maintained of sufficient thinness so as not to constitute an appreciable reluctance factor, otherwise the efficiency of low current holding magnets, such as are now used in printing telegraphy, would be impaired.

An object of the present invention, is the provision of a testing apparatus which is capable of determining the thickness of extremely light plating deposits, one which will permit of rapid recording and observations, which will be rugged and efficient over continuous periods of operations, and yet may be constructed simply and economically.

Briefly, the present invention comprises a housing having an inclined panel board which supports an A. C. milliammeter and A. C. voltmeter. A measured alternating current under the supervision of the milliammeter is impressed upon a primary winding which surrounds one leg of a transformer core, another leg of which has placed around it a secondary winding. The current induced in the circuit of the secondary is led to the input of an amplification transformer in order to increase the voltage to such proportions that it may be registered satisfactorily upon the A. C. voltmeter. The magnetic circuit of the principal transformer is open ordinarily, but may be bridged by the placement across its pole faces of an object under test; e. g. an armature or a magnet core.

As the gap between the core and the bridging medium under test varies due to the plating deposit, so will the reluctance of the magnetic path change in the open core transformer, correspondingly affecting the magnetic flux which in turn causes a change in the input of the amplifier transformer coil which leads to the voltmeter. This change will manifest itself upon the voltmeter by a variation in voltage reading which may be calculated into terms of plating deposit thickness.

Figure 2:
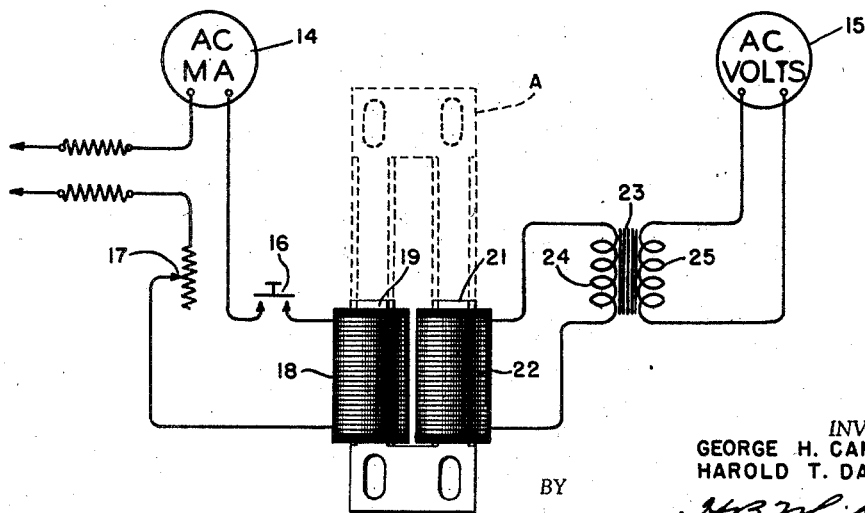

For a more comprehensive understanding of the present invention, reference may be had to the accompanying drawing and to the detailed specification following hereinafter wherein like reference characters indicate corresponding parts throughout, and wherein;

Fig. 1 is a perspective view of a galvanometric thickness testing apparatus constructed in accordance with the principles of the present invention, and Fig. 2 is a circuit diagram illustrating a wiring arrangement, such as may be employed in connection with the apparatus illustrated in Fig. 1.

In the accompanying drawing, the reference character 11 denotes a rectangular cabinet or carrying case. This housing is preferably made portable by having applied to it a carrying handle (not shown) so that it may be transported from one place to another in an assembly line, or at an inspection table where plated piece parts, such as are to be tested, can be conveniently routed. A suitably shaped cover may be secured to the housing to enclose and protect the panels 12 and 13. This may be shaped so as to complement the rectangular formation determined by the base of the unit.

The panel section 12 which contains the milliammeter 14 and the voltmeter 15 is supported in an inclined position so as to be readily visible from the front to an observer when the unit is resting upon a table. The sides of the box 11 are sloped to conform with the inclination of the panel 12, as is well known in cabinet work construction. Panel 13 is supported in a horizontal plane, and on its interior face are mounted several of the elements which are designated diagrammatically in Fig. 2. The consideration which has been given to the mounting and to the construction of this apparatus aside from the novelty of the circuit and methods of use, grew out of need for an extremely light and portable gauge so that it may have the advantages of occupying but little space in an inspection line and so as to be easily removable for adjustment or replacement.

Through suitable openings near the foreportion of panel 13, there protrude two pole faces which are the extremities of legs 19 and 21 of an open transformer core and around which are placed the primary coil winding 18 and the secondary coil winding 22. In circuit with the A. C. milliammeter 14 is a push button control switch 16, the winding of primary coil 18, a source of alternating current, and a variable resistor 17 for regulating the current input into the primary coil 18 of the open core transformer. Since commercially available current has been found to fluctuate, a reading to be maintained constant should be checked at frequent intervals.

Where a thickness test device of this type is intended to be used in gauging certain assembly piece parts and particularly in the case of "U" shaped armatures or magnet cores, it has been found expedient to construct the principal transformer of the identical element as the one under test. For this reason, it may be observed that the legs 19 and 21 will conform with and abut perfectly those of the piece part core A, indicated in dotted outline Fig. 2.

In order to assist in placement and aligning of the cores A over the transformer pole faces of legs 19 and 21 with great rapidity, an aligning plate 26 is provided, held in place by suitable dowel pins 27 and made of nonmagnetic material preferably slotted as at 28 so as not to be constituted a shadowing ring or inductance factor, but of sufficient thickness that the openings 29 thereof may be flared to admit and align the legs of the test core A. Of course the alignment plate 26 is removable from the pins 27 and in its stead may be placed any other plate whose shape conforms to the individual requirements of other objects, the thickness of whose plating deposit is to be measured. In this way, the test unit lends itself to be used with a great many different types of piece parts while yet affording individual conformity and ready alignment to each.

Referring now to Fig. 2, it will be noted that when the test core A is brought into the position indicated with its legs abutting squarely those of the transformer core, the magnet circuit is completed and the flux generated by the impressed current in winding 18 sets up a secondary or induced current in the winding 22. The secondary current of winding 22 is then impressed upon a primary winding 24 in an amplifier transformer 23, the secondary winding 25 of which is located in a circuit with the A. C. voltmeter 15. On account of the plating deposit on the faces of the pole legs of the core A under test, there will be introduced a corresponding reluctance into the magnetic path which, as the thickness of the deposits varies, will constitute a varying factor effecting a change in the output of coil 22 and, accordingly, a change in the amplified voltage which is applied across the voltmeter 15. Each piece part may be checked before and after plating and in accordance with a comparison chart, the thickness of the plating may be calibrated from the voltage reading on the meter 15. Experiments conducted with this device over an extensive period of time and under practical conditions have proved that thickness variations of .0001" may be instantly and conveniently detected.

The rheostat 17 is equipped with an adjustment knob which may be seen extending through the horizontal panel 13 and the push button switch 16 is provided with a mortised head that may be seen to the left of plate 26, also on the panel 13. In practice, when a predetermined input current has been obtained by the regulating knob 17, a quantity of cores or armatures before plating are subjected to the test and the voltage reading of each is marked directly on the piece part or where this is not feasible by suitable tagging of the piece parts. Thereafter, when the plating operations have been completed, the same piece parts are again subjected to the test and those whose increment of change as manifest by the voltmeter 15 is not within certain limits or tolerance are accordingly rejected, the determination being based upon a comparison with the original reading.

While the present invention has been described in contemplation of a specific embodiment, as illustrated on the accompanying drawing, and as described in the foregoing specification, it is to be understood nevertheless that numerous changes and modifications may be made without departing from the spirit or scope thereof; accordingly, it is not intended to be restricted in any manner except as indicated by the language of the hereunto appended claims.

What is claimed is:

1. In an electrical measuring instrument for measuring nonmagnetic surface deposit on magnetic circuit elements, an enclosure having an apertured test panel, an open magnetic circuit transformer mounted within said enclosure with its pole faces exposed in an aperture in said panel, means associated with the primary winding of said transformer for metering the electrical input thereto, means associated with the secondary winding of said transformer for metering the electrical output thereof, and means removably and interchangeably carried by said panel for aligning a magnetic circuit element to be measured in magnetic circuit closing relation to said transformer pole faces.

2. In an electrical measuring instrument for measuring nonmagnetic surface deposit on magnetic circuit elements, an enclosure having apertured test and measuring instrument panel, an open magnetic circuit transformer mounted within said enclosure with its pole faces exposed in an aperture in said panel, means carried by said instrument panel and electrically associated with the primary winding of said transformer for metering the electrical input thereto, means also carried by said instrument panel and electrically associated with the secondary winding of said transformer for metering the electrical output thereof, and means characterized by inability to absorb magnetic energy removably and interchangeably carried over the aperture in said panel for aligning a magnetic circuit element to be measured in bridging relation to said transformer pole faces.

3. In an electrical measuring instrument for measuring nonmagnetic surface deposit on magnetic circuit elements, an enclosure having an apertured test panel, an open magnetic circuit transformer mounted within said enclosure with its pole faces exposed in an aperture in said panel, means associated with the primary winding of said transformer for metering the electrical input thereto, means associated with the secondary winding of said transformer for metering the electrical output thereof, and metallic means slotted to avoid absorption of magnetic energy from said transformer removably and interchangeably carried by said panel over said aperture for aligning a magnetic element to be measured in bridging relation to said transformer pole faces.

4. A method of testing the depth of nonmagnetic coatings on magnetic circuit elements which comprises the steps of bridging an open magnetic circuit by an uncoated magnetic circuit element, energizing said magnetic circuit by electricity of a known magnitude, determining the magnitude of the magnetic energy in the bridged magnetic circuit, applying the nonmagnetic coating to the element, bridging the open magnetic circuit by the coated element, energizing said magnetic circuit by electricity of the known magnitude, determining the magnitude of the magnetic energy in the bridged magnetic circuit, and comparing the two magnitudes of magnetic energy.

5. In an electrical measuring instrument for measuring nonmagnetic surface deposit on the pole faces of U-shaped magnet core elements, an enclosure having an apertured test panel, means for supporting within said enclosure one of said elements committed to serve as a testing core with its pole faces exposed in an aperture in said panel, windings for the legs of said core element, means for applying a testing voltage to one of said windings, means associated with said one winding for metering the electrical input thereto, and means associated with said other winding for metering the electrical output thereof.

GEORGE H. CAMPION.
HAROLD T. DAHLGREN.